United States Patent [19]

McBroom

[11] Patent Number: 4,600,019
[45] Date of Patent: Jul. 15, 1986

[54] CORN COB SAVER SIEVE FOR COMBINES

[76] Inventor: Chester L. McBroom, R.R. No. 6 Box 351, Princeton, Minn. 55371

[21] Appl. No.: 733,193

[22] Filed: May 13, 1985

Related U.S. Application Data

[63] Continuation of Ser. No. 539,296, Oct. 5, 1983, abandoned.

[51] Int. Cl.⁴ .............................................. A01F 12/44
[52] U.S. Cl. ................... 130/27 Z; 56/14.2; 56/16.5; 209/397
[58] Field of Search ............ 130/5 R, 5 B–5 K, 130/6, 27 Z, 24; 56/16.5, 14.2, 14.6; 209/397, 398

[56] References Cited

U.S. PATENT DOCUMENTS

| 677,857 | 7/1901 | Clement | 209/398 |
| 882,723 | 3/1908 | Stradley | 130/6 |
| 1,939,314 | 12/1933 | Neifert et al. | 209/397 |
| 3,109,433 | 11/1963 | Claas | 130/27 Z |

Primary Examiner—Jay N. Eskovitz

[57] ABSTRACT

The adjustable chaffer and lower sieve of a combine harvester are replaced by a cob catcher or cob-saving sieve which allows corncobs along with shelled corn to be recovered as a mixture from the harvester rather than separating the corn from the cobs and discarding the cobs. The cob-saving sieve comprises a framework incorporating parallel inclined vanes sufficiently spaced apart to allow cobs to pass therethrough and disposed at an angle to direct airflow from the harvester fan over the surface of the sieve for removal of unwanted material.

3 Claims, 5 Drawing Figures

CORN COB SAVER SIEVE FOR COMBINES

This application is a continuation of co-pending application Ser. No. 539,296 (filed Oct. 5, 1983), and now abandoned.

BACKGROUND OF THE INVENTION

The present invention relates to corn harvesting and more particularly to a novel attachment for a combine harvester.

Recent studies have found that earcorn especially high-moisture earcorn is equal to, or better feed than shelled corn for the dairy cow or growing feeder cattle, especially high-moisture earcorn. This finding has the advantage of allowing a farmer to recover a higher tonnage of feed per acre than previously while also improving the quality of the feed. Also, corncobs are being used as fuel and in biomass procedures. Conventional combine harvesters used for harvesting corn are efficient machines but are effectively limited to harvesting only shelled corn or corn incorporating only small amounts of cob and discharge most of the cob back onto the ground. This is attributed, inter alia, to the fact that when the fingered vanes on the harvester's adjustable chaffer are opened to allow larger amounts of broken cob to fall through, the vanes are almost vertical. This tends to causes causes pieces of cob to lodge in the fingers and plug the chaffer. As a result, the vanes must be lowered and less cob can be obtained for a corn-and-cob-mix.

The present invention provides an attachment for a combine harvester which allows for the harvesting of a mix of corn-and-cob incorporating a higher percentage of cob than previously which can be used for feed or the cob can be separated and used for other purposes.

DESCRIPTION OF THE PRIOR ART

Applicant acknowledges the following U.S. Pat. Nos. pertaining to harvesting equipment and the like, none of which is believed to disclose the features of the present invention:

| | | |
|---|---|---|
| 585,093 | J. H. Gilman | June 22, 1897 |
| 2,960,988 | T. R. Peterson | Nov. 22, 1960 |
| 3,126,894 | J. H. Bornzin et al | Mar. 31, 1964 |
| 3,348,780 | R. Barkstrom et al | Oct. 24, 1967 |

SUMMARY OF THE INVENTION

In accordance with the invention, the conventional chaffer and lower sieve of a combine harvester are replaced by a cob-saving sieve structure comprising a framework incorporating a series of inclined parallel vanes, or the like, spaced apart at a distance to allow substantial quantities of harvested cob along with shelled corn to pass therethrough to provide a corn and cob mix having a higher percentage of cob therein than can be achieved by opening the fingers of the conventional chaffer to the maximum degree, said vanes being angled to direct airflow from a fan of the harvester over the surface of the sieve to keep unwanted material such a chaff, leaves and the like moving out of the harvester.

In a preferred form of the invention, for example, each vane of the cob-saving sieve may comprise an angle member having a substantially horizontal limb defining the top surface of the sieve and a dependent inclined limb, the vanes being supported in an outer rectangular framework and by longitudinal support rods extending through aligned openings in the respective vanes.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 5:
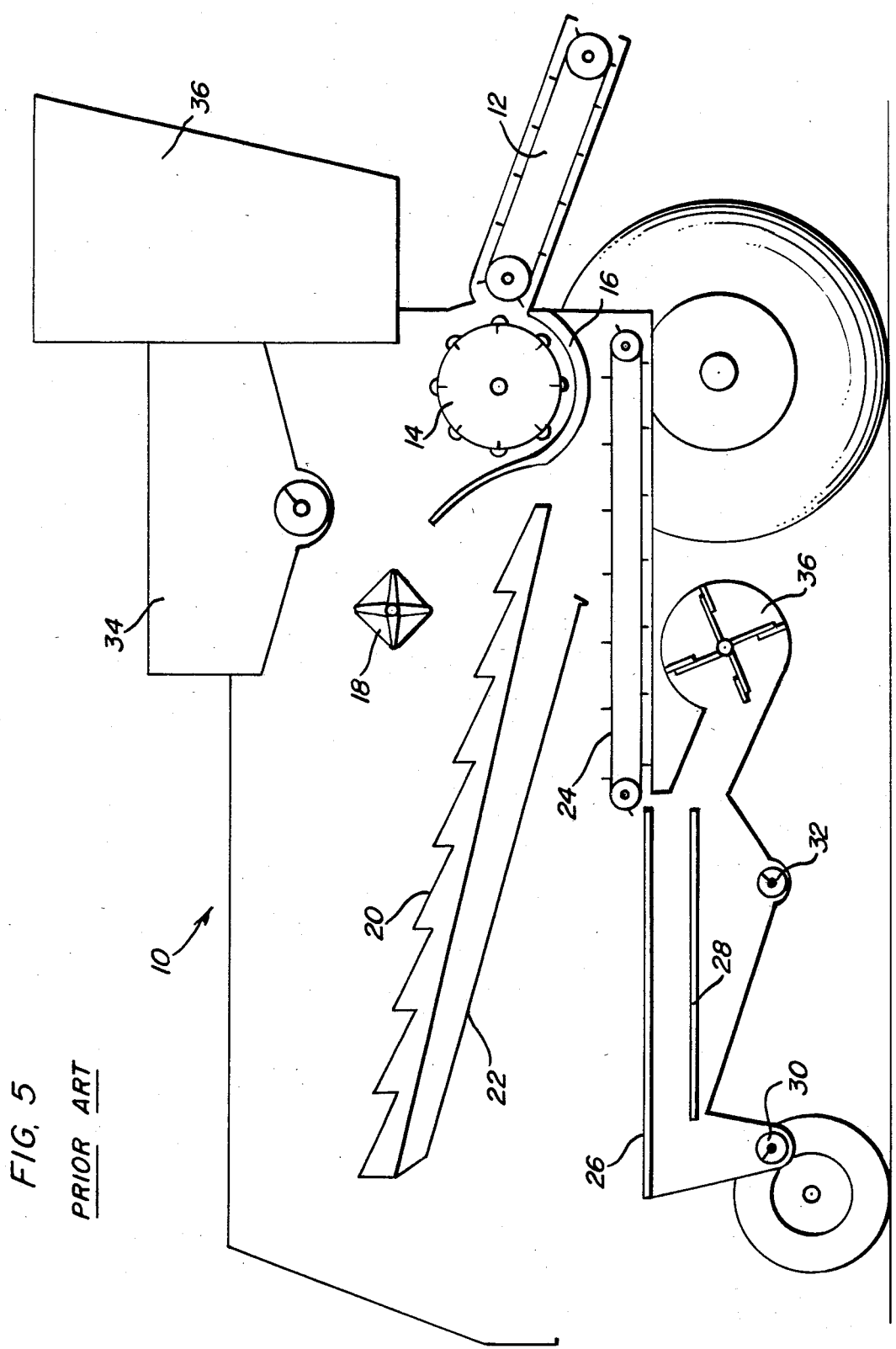
FIG. 5 is a diagrammatic view illustrating the functional components of a conventional form of combine harvester.

Referring initially to FIG. 5, there is schematically illustrated a common form of combine harvester 10 which is well known in the art, and the features of which will not therefore be described herein in detail. Harvester 10 includes a feeder house 12 for conveying whole corn into the harvester from a cutting or picking attachment (such as attachment 49 in FIG. 1), a cylinder 14 for thrashing the corn so as to break up the cobs, a concave or grate-like housing 16 around the rear and lower part of the cylinder and which collects the thrashed corn, a beater 18 which spreads straw, stalks and other coarse material from the cylinder over a straw rack 20, the straw rack being shaken to allow corn left in the straw to fall through while removing the straw from the harvester, a corn return pan 22 for returning corn from under the straw rack to a raddle chain 24 which collects all the unclean corn and drops same onto an adjustable chaffer 26, the chaffer having fingered vanes which are rotated to adjust opening size and allow corn to pass therethrough while leaves, straw and the like pass over and out of the harvester, an adjustable sieve 28 of similar construction to the chaffer but having a smaller opening size to further separate the corn, a tailings auger 30 for conveying material passing over the adjustable sieve and returning same to cylinder 14 for rethrashing, a clean corn auger 32 for conveying corn which has passed through the adjustable sieve and elevating same to a grain tank 34, a fan 36 for producing a current of air directed upwardly through and over the chaffer 26 and sieve 28 to carry unwanted material such as hulls, chaff, or leaves out of the harvester, and a cab 36 for the operator.

Figure 1:
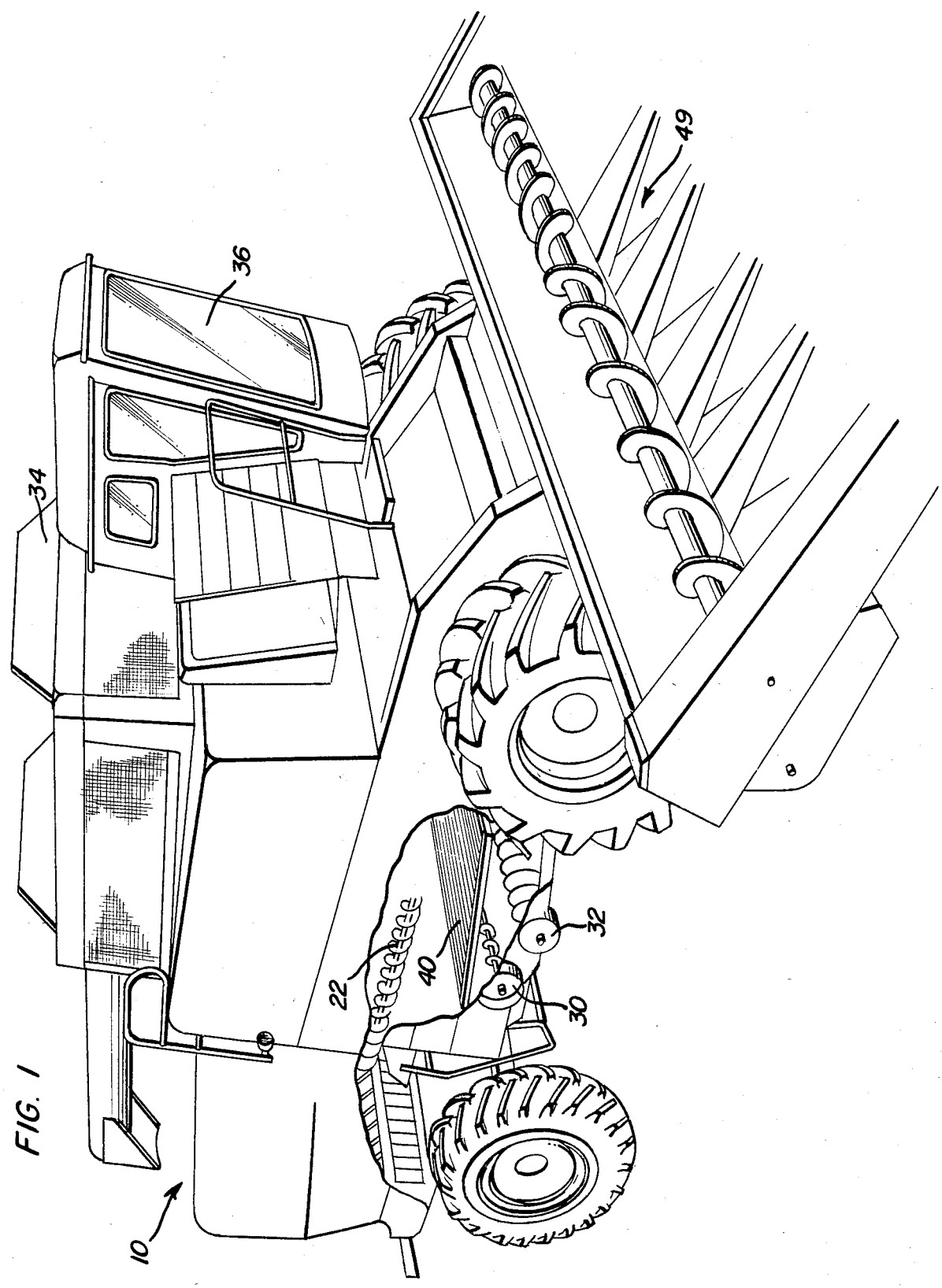
FIG. 1 is a perspective view of a combine harvester, partly broken away to show a sieve attachment in accordance with the invention fitted in place of a conventional chaffer and lower sieve.
Figure 2:
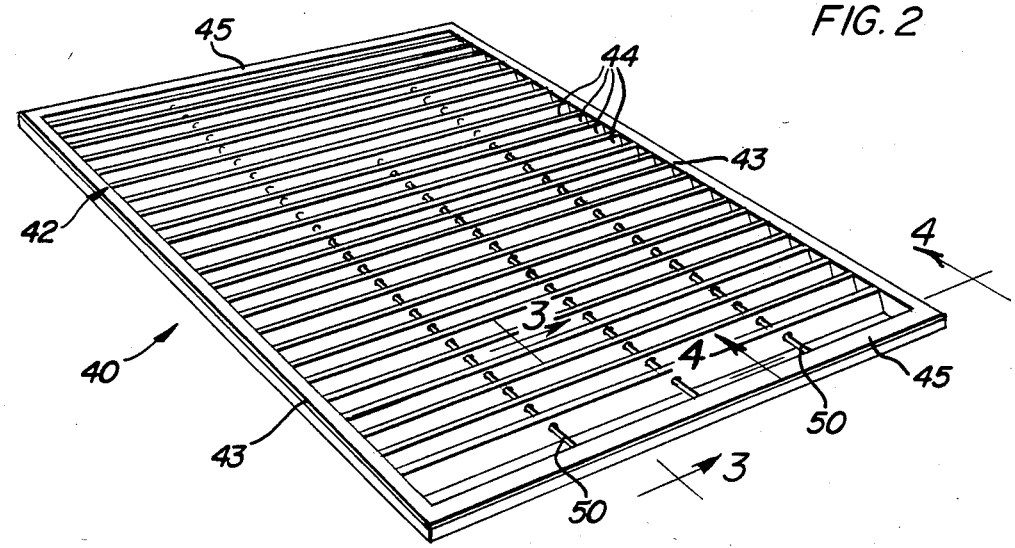
FIG. 2 is a perspective view of a sieve attachment in accordance with the invention.
Figure 3:
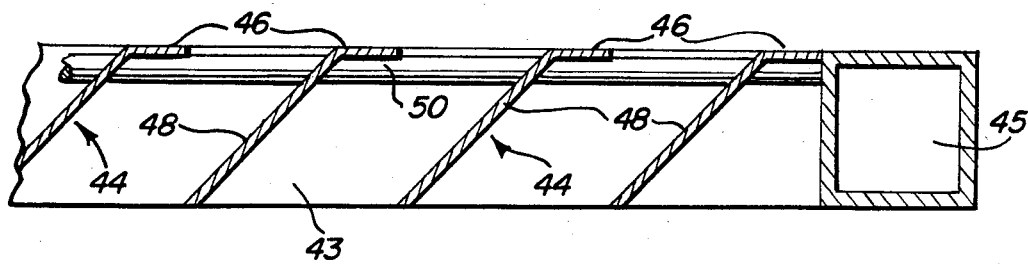
FIG. 3 is a sectional view on line 3 of FIG. 2.
Figure 4:
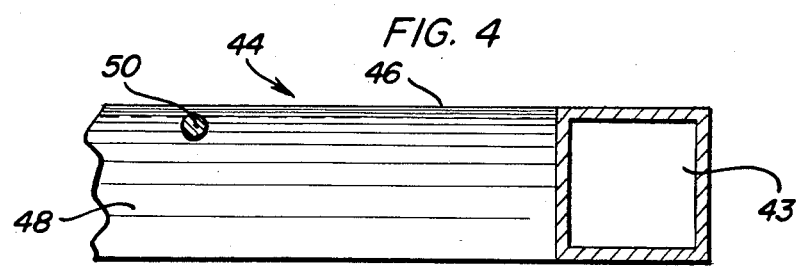
FIG. 4 is a sectional view on line 4—4 of FIG. 2.

As previously noted, in conventional harvesters as described above even if the adjustable fingers of chaffer 26 are opened to their maximum, this does not effectively allow for the harvesting of a cob and corn mix containing a substantial quantity of cobs. Thus, in accordance with the present invention, the chaffer 26 and sieve 28 of a conventional harvester are removed and replaced with a cob-saving sieve structure 40 illustrated in detail in FIGS. 2–4. The sieve structure comprises a rectangular box section frame 42 of similar outline to that of the conventional chaffer 26, so that the frame may be mounted in harvester 10 in the chaffer mountings, as shown in FIG. 1. The frame comprises elongate side members 43 and transverse end members 45. Internally, the frame has a series of parallel transversely extending vanes 44 extending the full width of the frame, each vane comprising an upper horizontal limb 46 substantially level with the top of frame 42, and a downwardly inclined limb 48. The spacing between the vanes 44 is sufficient to allow large amounts of harvested cob received from raddle chain 24 to pass through the sieve without plugging, and the vanes are configured to provide a smooth surface at the top to allow trash to slide freely over the sieve without catching. Further, the sieve structure is positioned in the harvester with the vanes being inclined downwardly toward fan 36, the angle of inclination of each vane being such as to direct airflow from the fan over the surface of the sieve to keep chaff, leaves and other unwanted material moving out of the harvester. The angle of inclination of the vanes may, for example, be of the order of about 45°, and the spacing spacing between the vanes may be about 2 inches. The vanes may be welded at their opposite ends to the frame 42, and they may be stabilized and supported by longitudinal support rods 50 positioned through openings adjacent the top limbs 46 of the respective vanes.

A cob saving sieve in accordance with the invention, when used in a harvester in place of the conventional chaffer and lower sieve may save from about 75% or more of the cut cob. The structure requires no alterations in other harvester components and can be installed in a matter of minutes. It also performs well in snow which tends to plug conventional sieves. The sieve of this invention may also be used in conventional axial flow combines (not shown).

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cob saver sieve for use in a combine harvester or other harvester equipment and comprising:
    (A) a rectangular frame having longitudinally extending side members and transversely extending end members;
    (B) a series of inclined vanes disposed between the frame side members in parallel relationship to the frame end members, each vane having a substantially horizontal top limb, and said limbs together defining the top surface of the cob-saving sieve; and
    (C) a plurality of transversely spaced and longitudinally extending vane support rods attached between the frame end members and passing through aligned openings in the respective vanes adjacently below the top limbs thereof.

2. The invention of claim 1 wherein the vanes are angled downwardly toward the fan at an angle of about 45°.

3. The invention of claim 1 wherein the vanes are spaced about 2 inches apart.

* * * * *